United States Patent
Frodsham et al.

(10) Patent No.: US 10,639,602 B2
(45) Date of Patent: May 5, 2020

(54) MAGNETIC MIXER AND METHOD

(71) Applicant: Medisieve Ltd., Sheldwich, Faversham, Kent (GB)

(72) Inventors: George Charles Martin Frodsham, Sheldwich (GB); Quentin Andrew Pankhurst, St Albans (GB)

(73) Assignee: MEDISIEVE LTD, London (GB)

( * ) Notice: Subject to any disclaimer, the term of this patent is extended or adjusted under 35 U.S.C. 154(b) by 240 days.

(21) Appl. No.: 15/662,446

(22) Filed: Jul. 28, 2017

(65) Prior Publication Data

US 2018/0028990 A1 Feb. 1, 2018

Related U.S. Application Data

(60) Provisional application No. 62/367,712, filed on Jul. 28, 2016.

(51) Int. Cl.
| | |
|---|---|
| *B01F 13/08* | (2006.01) |
| *B03C 1/033* | (2006.01) |
| *B01F 7/00* | (2006.01) |
| *B03C 1/30* | (2006.01) |
| *B03C 1/01* | (2006.01) |
| *B03C 1/28* | (2006.01) |
| *B01F 15/00* | (2006.01) |

(Continued)

(52) U.S. Cl.
CPC ...... *B01F 13/0809* (2013.01); *B01F 7/00908* (2013.01); *B01F 15/00389* (2013.01); *B01F 15/00538* (2013.01); *B03C 1/01* (2013.01); *B03C 1/0332* (2013.01); *B03C 1/0335* (2013.01); *B03C 1/288* (2013.01); *B03C 1/30* (2013.01); *H01F 7/0231* (2013.01); *H02P 8/14* (2013.01); *B01F 2215/0036* (2013.01); *B03C 1/02* (2013.01); *B03C 2201/18* (2013.01); *B03C 2201/26* (2013.01)

(58) Field of Classification Search
CPC .................................................. B01F 13/0809
USPC ................................ 366/273, 274; 417/420
See application file for complete search history.

(56) References Cited

U.S. PATENT DOCUMENTS

| | | | | |
|---|---|---|---|---|
| 2,827,856 A | * | 3/1958 | Zozu Lin | .................. F04D 3/00 417/420 |
| 3,995,835 A | | 12/1976 | Cichy et al. | |

(Continued)

FOREIGN PATENT DOCUMENTS

| | | |
|---|---|---|
| WO | 02094351 | 11/2008 |
| WO | 2009097159 | 8/2009 |

OTHER PUBLICATIONS

Bertoni et al., "Nanochains Formation of Superparamagnetic Nanoparticles," J. Phys. Chem. C 2011, 115, 7249-7254.

(Continued)

*Primary Examiner* — David L Sorkin
(74) *Attorney, Agent, or Firm* — K&L Gates LLP (57) ABSTRACT

A molecular mixing system. In one embodiment, the molecular mixing system includes a motorized turntable; a speed controller to control the rotational speed of the motorized turntable; a plurality of magnets arranged in a first Halbach array, the first Halbach array located on the motorized turntable and concentric to the axis of the motorized turntable; and a sample conduit having an input port and an output port and having an outer wall defining a lumen, the sample conduit positioned within and concentric with the first Halbach array.

16 Claims, 10 Drawing Sheets

(51) Int. Cl.
*H01F 7/02* (2006.01)
*H02P 8/14* (2006.01)
*B03C 1/02* (2006.01)

(56) References Cited

U.S. PATENT DOCUMENTS

| | | | |
|---|---|---|---|
| 4,390,283 A * | 6/1983 | Meyer | B01F 13/0818 |
| | | | 366/142 |
| 4,554,088 A | 11/1985 | Whitehead et al. | |
| 5,123,901 A | 6/1992 | Carew | |
| 5,439,586 A | 8/1995 | Richards et al. | |
| 5,505,594 A * | 4/1996 | Sheehan | F04D 3/02 |
| | | | 415/72 |
| 5,708,313 A * | 1/1998 | Bowes | H02K 29/106 |
| | | | 310/63 |
| 5,951,877 A | 9/1999 | Langley et al. | |
| 5,980,479 A | 11/1999 | Kutushov | |
| 6,051,146 A | 4/2000 | Green et al. | |
| 6,071,422 A | 6/2000 | Hlavinka et al. | |
| 6,100,618 A * | 8/2000 | Schoeb | F04D 1/006 |
| | | | 310/90 |
| 6,153,113 A | 11/2000 | Goodrich et al. | |
| 6,231,760 B1 | 5/2001 | Siddiqi | |
| 6,280,622 B1 | 8/2001 | Goodrich et al. | |
| 6,616,623 B1 | 9/2003 | Kutushov | |
| 6,764,859 B1 | 7/2004 | Kreuwel et al. | |
| 7,699,979 B2 | 4/2010 | Li et al. | |
| 8,557,518 B2 | 10/2013 | Jovanovich et al. | |
| 8,768,501 B2 | 7/2014 | Fischer et al. | |
| 8,841,104 B2 | 9/2014 | Dryga et al. | |
| 8,870,446 B2 | 10/2014 | Rida | |
| 8,999,732 B2 | 4/2015 | Rida | |
| 9,150,631 B2 | 10/2015 | Super et al. | |
| 9,156,037 B2 | 10/2015 | Yung et al. | |
| 9,347,595 B2 | 5/2016 | Toner et al. | |
| 9,389,225 B2 | 7/2016 | Dryga et al. | |
| 9,428,547 B2 | 8/2016 | Dryga et al. | |
| 9,593,160 B2 | 3/2017 | Ingber et al. | |
| 9,636,689 B2 | 5/2017 | Smith et al. | |
| 10,411,571 B2 * | 9/2019 | Bendixen | F04D 13/027 |
| 2001/0009645 A1 * | 7/2001 | Noda | F04D 3/02 |
| | | | 417/355 |
| 2004/0066107 A1 * | 4/2004 | Gery | H02K 49/106 |
| | | | 310/103 |
| 2004/0114458 A1 | 6/2004 | Berthier et al. | |
| 2005/0286342 A1 | 12/2005 | Garcia et al. | |
| 2006/0133194 A1 * | 6/2006 | Takahashi | B01F 5/102 |
| | | | 366/147 |
| 2007/0207272 A1 | 9/2007 | Puri et al. | |
| 2008/0292478 A1 * | 11/2008 | Baykut | F04D 3/02 |
| | | | 417/420 |
| 2013/0164161 A1 * | 6/2013 | Schob | F04D 1/006 |
| | | | 417/420 |
| 2013/0217144 A1 | 8/2013 | Rida | |
| 2013/0330219 A1 * | 12/2013 | Larose | F04D 13/06 |
| | | | 417/420 |
| 2015/0259638 A1 * | 9/2015 | Zeuch | C12M 23/14 |
| | | | 435/302.1 |

OTHER PUBLICATIONS

Biswal et al., "Micromixing with Linked Chains of Paramagnetic Particles," Anal. Chem. 2004, 76, 6448-6455.
Calhoun et al., "Paramagnetic particles and mixing in micro-scale flows," Lab Chip, 2006, 6, 247-257.
Correa-Duarte et al., "Alignment of Carbon Nanotubes under Low Magnetic Fields through Attachment of Magnetic Nanoparticles," The Journal of Physical Chemistry B Letters, 2005, 109, 19060-19063.
Fang et al., "Magnetic-field-induced chain-like assembly structures of FE3O4 nanoparticles," EPL, 77 (2007) 68004, 6 pgs.
Frodsham et al., "Biomedical applications of high gradient magnetic separation: progress towards therapeutic haeomofiltration," Biomed Tech (Berl), Oct. 2015;60(5):393-404.
Furst et al., "Micromechanics of Dipolar Chains Using Optical Tweezers," Physical Review Letters, 82 (20):4130-4133, May 17, 1999.
Ganguly et al., "Field-Assisted Self-Assembly of Superparamagnetic Nanoparticles for Biomedical MEMS and BioMEMS Applications," Advances in Applied Mechanics, 41:1-43, 2006.
Häfeli et al., "Optical method for measurement of magnetophoretic mobility of individual magnetic microspheres in defined magnetic field," Journal of Magnetism and Magnetic Materials, 293 (2005) 224-239.
Kang et al., "Chaotic mixing induced by a magnetic chain in a rotating magnetic field," Physical Review E 76, 066303 (2007), 11 pgs.
Kang et al., "Dynamics of magnetic chains in a shear flow under the influence of a uniform magnetic field," Phys. Fluids 24, 042001 (2012).
Ma, et al., "Fabrication of one-dimensional Fe3O4/P(GMA-DVB) nanochains by magnetic-field-induced precipitation polymerization," J. Colloid Interface Sci. (2012), 6 pgs.
Melle, et al., "Chain model of a magnetorheological suspension in a rotating field," Journal of Chemical Physics, 118 (21):9875-9881, Jun. 1, 2003.
Melle et al., "Chain Rotational Dynamics in MR Suspensions," submitted to World Scientific Jan. 24, 2002 : 09:31 P.M., 8 pgs.
Melle et al., "Microstructure evolution in magnetorheological suspensions governed by Mason number," Physical Review E 68, 041503 (2003), 11 pgs.
Petousis et al., "Transient behaviour of magnetic micro-bead chains rotating in a fluid by external fields," Lab Chip, 2007, 7, 1746-1751.
Vuppu et al., "Video Microscopy of Dynamically Aggregated Paramagnetic Particle Chains in an Applied Rotating Magnetic Field," Langmuir, 19(21):8646-8653, 2003.
Wang et al., "Magnetic Nanochains: A Review," NANO: Brief Reports and Reviews, 6(1):1-17 (2011).
Williams et al., "Characterization of magnetic nanoparticles using programmed quadrupole magnetic field-flow fractionation," Phil. Trans. R. Soc. A (2010) 368, 4419-4437.
Wilson et al., "Formation and properties of magnetic chains for 100 nm nanoparticles used in separations of molecules and cells," J. Magn Magn Mater. May 1, 2009; 321(10):1452-1458.
Yung et al., "An Analytic Solution for the Force Between Two Magnetic Dipoles," Magnetic and Electrical Separation, 9:39-52, 1998.
PCT International Search Report and Written Opinion of the International Searching Authority for International Application No. PCT/EP2016/071719, dated Nov. 29, 2016, 12 pages.
PCT International Search Report and Written Opinion of the International Searching Authority for International Application No. PCT/GB2017/052209, dated Jan. 9, 2018, 14 pages.

* cited by examiner

MONODISPERSE PARTICLES

FIG. 13(A)

CHAINS

FIG. 13(B)

MAGNETIC MIXER AND METHOD

CROSS-REFERENCE TO RELATED APPLICATIONS

This application claims priority to and the benefit of U.S. Provisional Patent Application No. 62/367,712, filed on Jul. 28, 2016, the entire disclosure of which is incorporated by reference herein.

FIELD OF THE INVENTION

The invention relates generally to supra-Brownian reaction chamber systems to enhance molecular collisions in flowing liquids, and more specifically to using self-assembling functionalized magnetic particulate chains which are actuated relative to the target containing fluid in order to increase collision rates between targets and one or more chemical agent (catalyst, antibody, reagent, functionalized magnetic nanoparticle, ligand, etc.) attached to the particulate chain.

BACKGROUND OF THE INVENTION

Magnetic nanoparticles and micron-sized composite particles have properties useful for the purpose of magnetic separation of target moieties from a fluid. Their surfaces may be functionalized to make them suitable for use as a target-specific binding surface. As a result of this property, magnetic nanoparticles and micron-sized microbeads have been used in laboratory bench-top systems for the purpose of magnetic separation of target components. In such bench-top systems, functionalized magnetic microbeads are mixed with small volumes of a fluid containing both the target moieties and other species in a container. The mixture is then exposed to a permanent magnet that produces an inhomogeneous magnetic field over the entire volume of the container. This actuates and concentrates the magnetic nanoparticles or microbeads at a predetermined location in the fluid container. The non-actuated materials in the supernatant may be separated off, and a chemical or other agent added to the mixture to cleave the bonds between the target moiety and the magnetic entities, thereby allowing the target components to be separated out and then further purified.

Such a magnetic separation method is not suitable if one wishes to apply the magnetic separation to a large volume of a given fluid. Further, the time required for the Brownian motion-mediated separation process when the container is placed near the magnet may be too long and thereby damage the components in the fluid.

What is needed is a method of accelerating the binding time between functionalized magnetic particles and target moieties.

The present invention addresses these requirements.

SUMMARY OF THE INVENTION

In one aspect, the invention relates to a molecular magnetic tagging system which creates a high collision rate between magnetic particles and target moieties in a flowing fluid. A fluid containing the magnetic particles is flowed through a magnetic field of controlled magnitude rotating at a controlled rate in such a way that the magnetic particles form rotating chains of a tunable length. These chains serve to increase the collision rate between the magnetic particles and their target moieties, thus decreasing the overall binding time.

In one embodiment, the system comprises a fluid including a plurality of magnetic particles that flows from input port to output port. In another embodiment, the fluid further comprises a plurality of magnetic nanoparticles. In yet another embodiment, the magnetic particles comprise a ligand. In still yet another embodiment, at least one of the magnetic particles and the magnetic nanoparticles comprises a ligand. In another embodiment, the molecular mixing system includes a motorized turntable; a speed controller to control the rotational velocity of the motorized turntable; a plurality of magnets arranged in a first Halbach array, the first Halbach array located on the motorized turntable and concentric to the axis of the motorized turntable; and a sample conduit having an input port and an output port and having an outer wall defining a lumen, the sample conduit positioned within the first Halbach array. In yet another embodiment, in operation, the first Halbach array rotates circumferentially about the outer circumference of the sample conduit.

In one embodiment, the sample conduit comprises a sample container. In another embodiment, the sample container includes an inner wall concentric with the outer wall and defining a lumen between the inner and outer wall, the lumen in fluid communication with the input and output ports. In yet another embodiment, the system comprises a second Halbach array of magnets within the inner wall of the sample container. In still yet another embodiment, the first Halbach array has a K=2. In another embodiment, the second Halbach array has a K=1. In yet another embodiment, the sample container has a truncated conical shape with the largest portion of the cone at the input port and the narrowest portion of the cone at the output port. In still another embodiment, the Halbach array comprises a plurality of Halbach arrays stacked axially adjacent one another. In still yet another embodiment, the plurality of stacked Halbach arrays are separated by a space. In still yet another embodiment, the plurality of Halbach arrays have varying heights and are stacked from the greatest height to the smallest height from input port to output port, through which the fluid could flow coaxially in either direction. In another embodiment, the molecular mixing system includes: a sample conduit having an input port and an output port and having an outer wall defining a lumen; a motorized carrier; a speed controller to control the rotational speed of the motorized carrier; and a pair of electromagnets attached to the motorized carrier and positioned on opposite sides of the sample conduit, wherein in operation the pair of electromagnets rotates circumferentially about the outer circumference of the sample conduit.

In another aspect, the invention relates to a method of mixing at a molecular level. In one embodiment, the method includes: providing a sample conduit having an input port and an output port; passing a fluid comprising a plurality of magnetic particles through the sample conduit from input port to output port; applying a magnetic field through the sample conduit; and rotating the magnetic field about an axis coaxial with the longitudinal axis of the sample conduit with an angular velocity. In another embodiment, the method further includes the step of adjusting the strength of the magnetic field and the angular velocity of the rotation of the magnetic field so as to form chains of magnetic particles.

In yet another aspect, the invention relates to a method of forming magnetic chains of selectable numbers of particles. In one embodiment, the method comprises passing the fluid containing the magnetic particles through a magnetic field of controlled magnitude rotating at a controlled rate such that the magnetic particles form rotating chains of a selectable size.

BRIEF DESCRIPTION OF THE DRAWINGS

The structure and function of the invention can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

FIG. 3 (A) is a top view of an embodiment of a sample chamber;

FIG. 3 (B) is a cross-sectional view of the embodiment of the sample chamber for FIG. 3(A);

FIG. 3 (C) is a bottom view of the embodiment of the sample chamber for FIG. 3(A).

FIG. 4 (A) is a perspective view of another embodiment of the chamber with an end piece removed to show the internal structure;

FIG. 4 (B) is a cross-sectional view of the embodiment of the chamber of FIG. 4(A) showing the flow path through the chamber;

FIG. 6 (A) is a top perspective drawing of an embodiment of a Halbach magnetic array with end field concentrators;

FIG. 6 (B) is a side perspective drawing of the embodiment of the Halbach magnetic array of FIG. 6 (A);

FIG. 6 (C) is a top perspective drawing of an embodiment of a Halbach magnetic array with a circumferential support;

FIGS. 7 (A), (B), (C), and (D) are drawings of the magnetic fields within a Halbach magnetic array with various orientations of the magnetic dipole in each of the permanent magnets;

FIG. 10 (A) is a perspective view of another embodiment of the Halbach array having an inner and outer cylinder of permanent magnets;

FIG. 10 (B) is a drawing of the magnetic fields within the Halbach magnetic arrays of FIG. 10(A);

DESCRIPTION OF A PREFERRED EMBODIMENT

Figure 1:
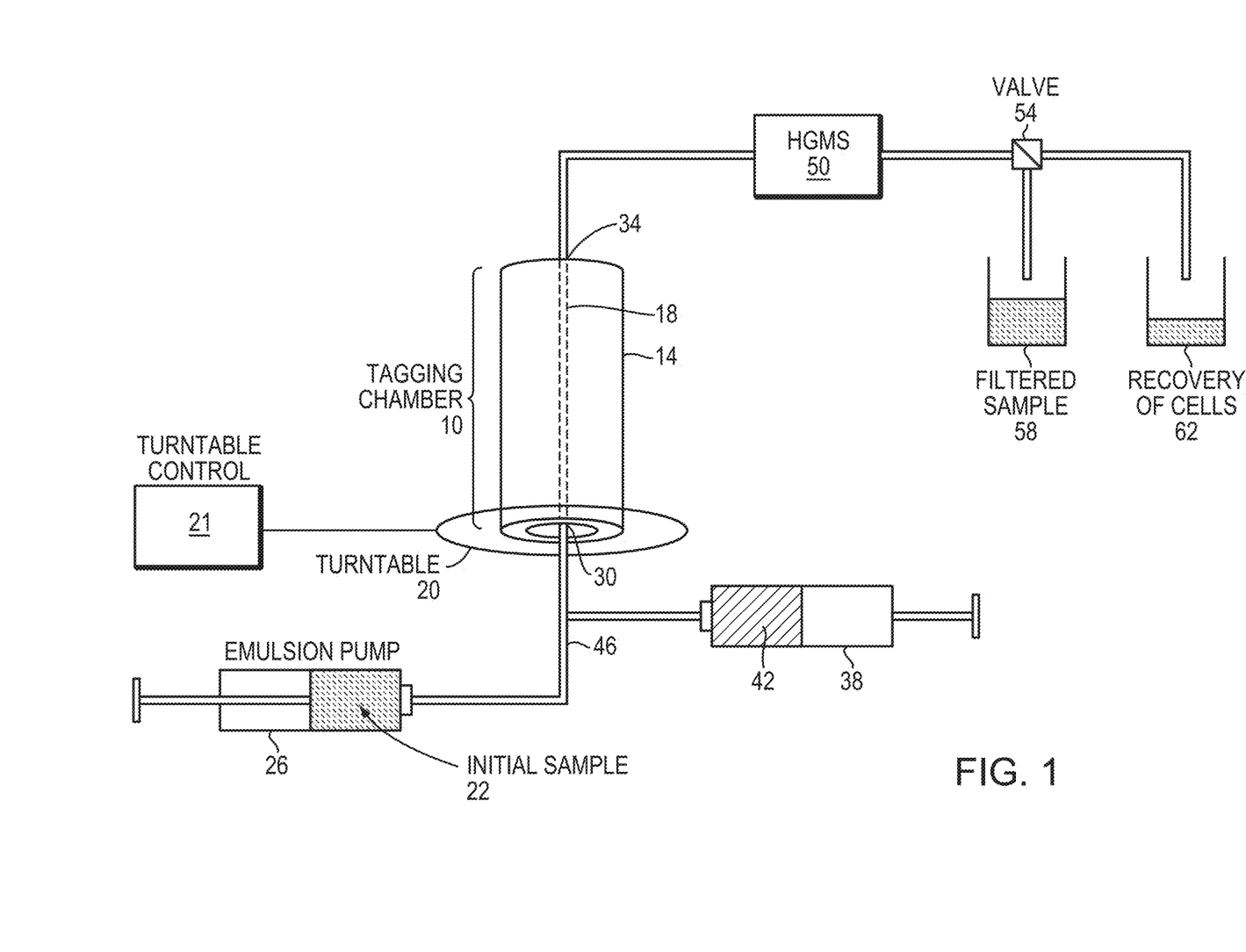
FIG. 1 is a diagram of an embodiment of the system of the invention.

In brief overview and referring to FIG. 1, an embodiment of a system constructed in accordance with the invention includes a tagging chamber 10 that includes a magnetic array 14 through which a sample chamber or conduit 18 is positioned. The magnetic array is located on a turntable 20 controlled by a controller 21. The turntable may be rotated by a standard motor or a stepper motor. A sample of interest 22 is pumped by a suitable pump 26 (a syringe pump is shown for clarity, but any pump may be used) through the input port 30 of the sample chamber or conduit 18 to the output port 34 of the sample chamber or conduit 18 for additional processing. A second pump 38 with a solution of magnetic separation particles 42 is also connected to the input port 30 of the sample conduit or chamber 18 through a T-connector 46 and mixes the magnetic separation particles 42 with the sample 22.

Once the sample 22 and the magnetic separation particles 42 have been mixed magnetically in the sample conduit or chamber 18, the mixture may be further treated as appropriate for the sample. In the embodiment shown, the mixture is passed to a High Gradient Magnetic Separation (HGMS) device 50 that separates targeted cells 62 from the other components 58 of a blood sample 22.

In operation, the magnetic separation particles 42 may be of two forms. In the first form, the magnetic particles are not small enough to be considered nanoparticles. Each particle, which in one embodiment is an iron oxide, is ferromagnetic and so is not magnetic in the absence of a magnetic field. This is because the magnetic domains of the particles are randomly oriented when no magnetic field is present. The particles therefore exist as individual particles in solution. In one embodiment, each individual magnetic particle is bound to a ligand that is unique to the component of interest in the sample. When the component in the sample is captured by the ligand of the magnetic particle, the component of interest is bound to the magnetic particle by the ligand.

When exposed to a magnetic field, the magnetic domains of the magnetic particle stop being randomly magnetized and align, and the magnetic particles develop a magnetic dipole. The magnetic particles then stick to other magnetic particles and form magnetic particle chains. The chains of particles are fairly stable and will remain as chains in a solution as long as any external forces applied to the chain do not overcome the dipole magnetic forces holding the chain together.

The magnetic array 14 is constructed to rotate with the turntable 21, thereby causing the magnetic field traversing the sample conduit or chamber 18 to rotate as discussed below. As the substantially homogeneous magnetic field rotates, the magnetic particle chains respond to the rotation of the magnetic field and begin to rotate also so as to align with the magnetic field. As a chain rotates, the chain experiences two forces: the force caused by the magnetic field, and a resistive drag force such as the Stokes drag force, which arises because the chain is moving through a viscous medium, the solution. The Stokes force increases as the rotational velocity of the rotating magnetic particle chain increases. As the rotational velocity of the magnetic field increases beyond a value determined by the rotational velocity of the chain, the length of the chain, and the viscosity of the solution, the Stokes force generated by the movement of the chain through the solution overcomes the dipole magnetic force holding the chain together and the chain begins to fragment or divide into more chains.

However, if the rotational velocity of the magnetic field is maintained by the controller 21 at a velocity less than what is necessary to fragment the entire chain, the portion of the chain remaining will rotate without further fragmentation. As the chain rotates, the particles that make up the chain sweep a volume space and any target component of interest that is in the swept volume will be captured by the ligands bound to the magnetic particles. This increases the number of collisions per unit time between the magnetic particles and the components of interest, thus increasing the binding efficiency and subsequent capture process.

In these embodiments, the motor rotating the turntable can be a standard AC or DC electric motor or it can be a stepper motor. In the case of an AC or DC motor, the controller 21 can use a simple voltage drop across a rheostat to control the speed of the motor and hence the turntable. In the case of a stepper motor, a pulse controller 21 is used to send pulses to the stepper motor at various repetition rates to control the rotational speed.

Figure 2:
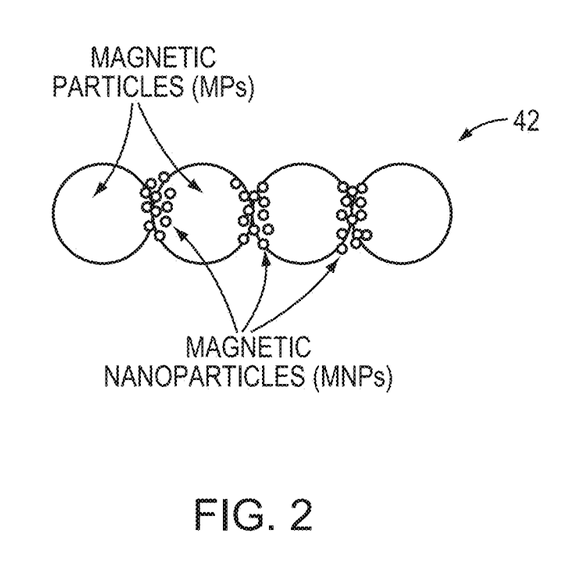
FIG. 2 is a drawing of a magnetic particle chain and magnetic nanoparticles under the influence of a magnetic field.

Coating magnetic particles is relatively expensive for various ligands, such as antibodies. To avoid this expense, a second embodiment of magnetic particles is used. In this embodiment, magnetic nanoparticles are added to the magnetic particles in solution. Rather than coating the larger magnetic particles with the ligand, the magnetic nanoparticles are coated with the ligand. Because the magnetic nanoparticles have a smaller surface area, less ligand is needed and the cost of the coated particles is less. When the magnetic nanoparticles and the magnetic particles are exposed to the magnetic field, the magnetic particles again form chains and the magnetic nanoparticles collect at the junctions of the chains of magnetic particles (FIG. 2). As the magnetic particle chains rotate, the magnetic nanoparticles rotate with the chains, again sweeping a volume of sample and capturing components that are of interest.

Figures 3A, 3B, 3C:
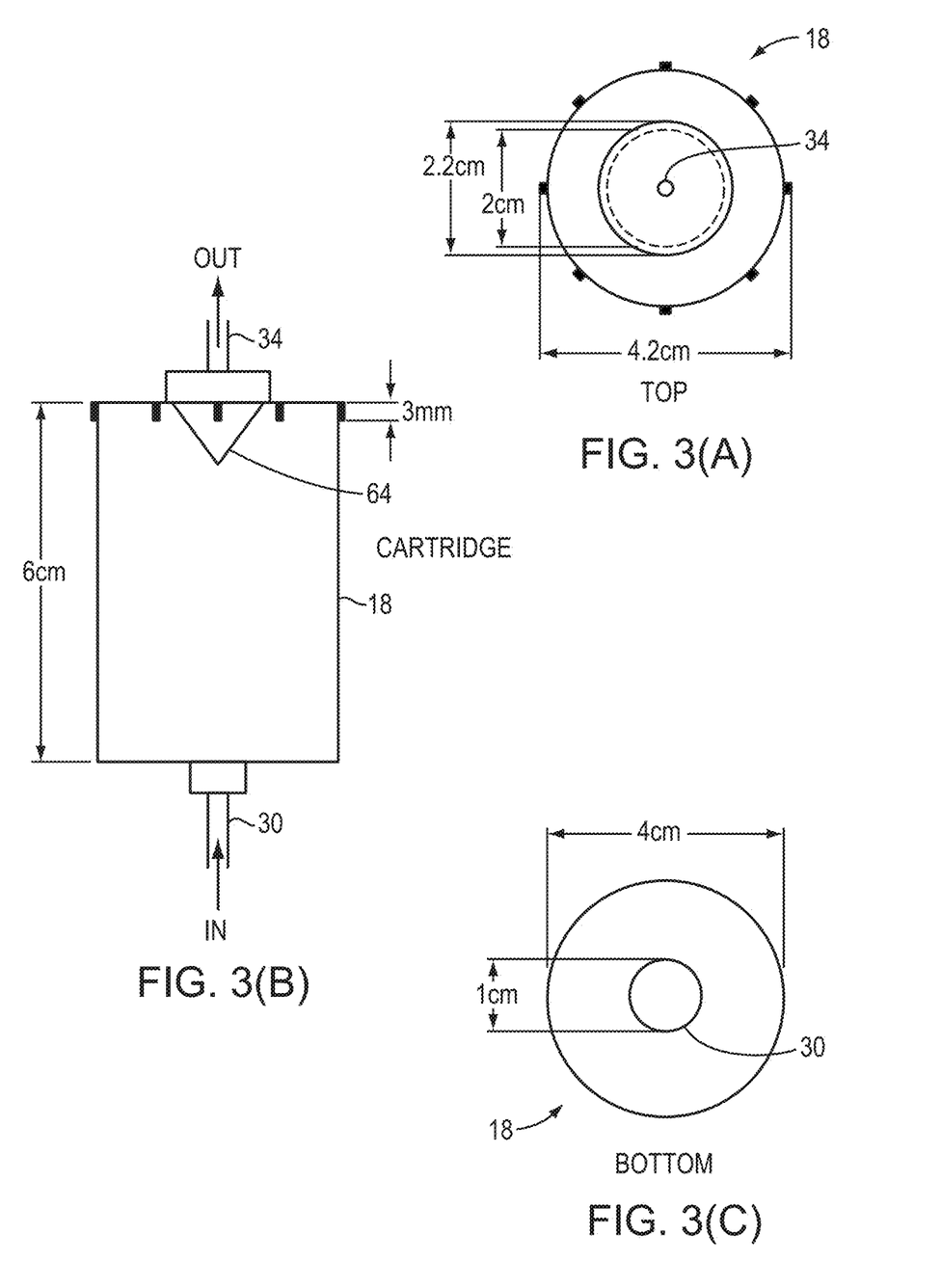

In more detail, in one embodiment, the sample conduit or chamber 18 is simply a tube through which the sample solution passes. In another embodiment, and referring to FIGS. 3(A), (B), and (C), the sample conduit or chamber 18 is a chamber having the structure shown in FIG. 3, constructed of polyethylene. In this embodiment, the sample chamber has an input port 30 at one end of a cylindrical container 18. At the other end of the cylindrical sample chamber is an output port 34. As with the previous conduit embodiment, the sample chamber 18 is sized to fit within the magnetic array 14.

The sample with the component of interest 22 and the magnetic particles 42 merge in the input port and enter the chamber 18. Once in the chamber 18, the magnetic field from the array 14 causes the magnetic particle chain formation and rotation, dispersed evenly across the chamber cross-section. As fluid leaves the chamber 18 through the output port 34, the chains of magnetic particles and bound target components are swept toward the output port 34. A cone 64 is placed along the axis of the input and output ports 30 and 34 respectively to deflect the flow toward the walls of the chamber 18, increasing the flow velocity around the cone in order to prevent clogging of the system at the exit. As will be discussed below, the field generated by the magnetic array 14 increases in strength toward the direction of the input port 30 near the chamber wall, the positive magnetic gradient creating a magnetic force which drags the magnetic particle chains with the fluid. This moves the magnetic particle chains away from the output port 34 and delays the elution of the magnetic particle chains from the chamber 18 by way of the output port 34. This increases the amount of time the ligands have to encounter a target component because the chains exist for longer within the chamber.

Figure 4A:
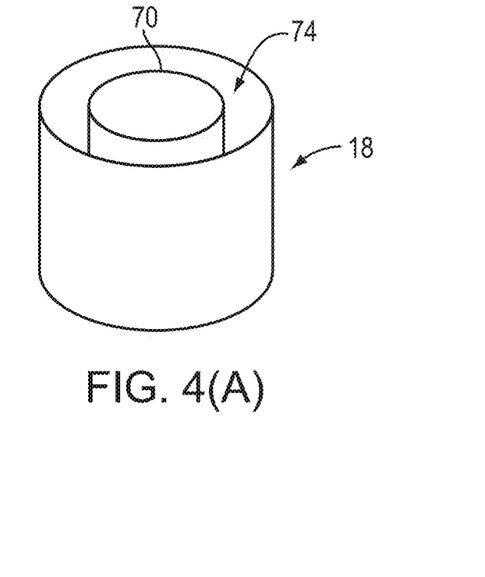
Figure 4B:
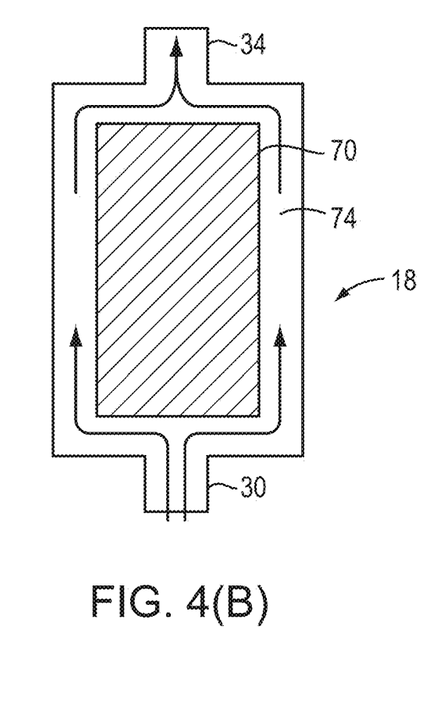

Referring to FIGS. 4(A) and (B), in another embodiment of the chamber 18 the central volume of the chamber is replaced with a cylinder 70 so as to form an elongated toroidal space 74. FIG. 4(A) depicts the chamber 18 with one end removed to show the creation of the toroidal volume 74 by the wall of the chamber 18 and the wall of the inner cylinder 70. FIG. 4(B) shows the fluid flow from the input port 30 around the cylinder 70 to the output port 34.

Figure 5:
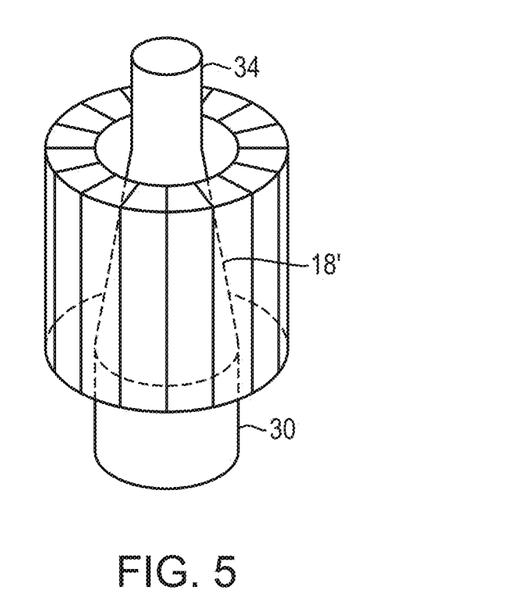
FIG. 5 is a perspective drawing of the tubular conduit in which the conduit is a truncated cone within the magnetic array.

Referring now to FIG. 5, another embodiment of the conduit 18 is depicted as a truncated cone 18' within the magnetic array 14. In this embodiment, as the sample 22 and the magnetic particles 42 move from input port 30 to output port 34 of the conduit 18', the available volume decreases due to the decreasing diameter of the conduit 18'

Figure 6A:
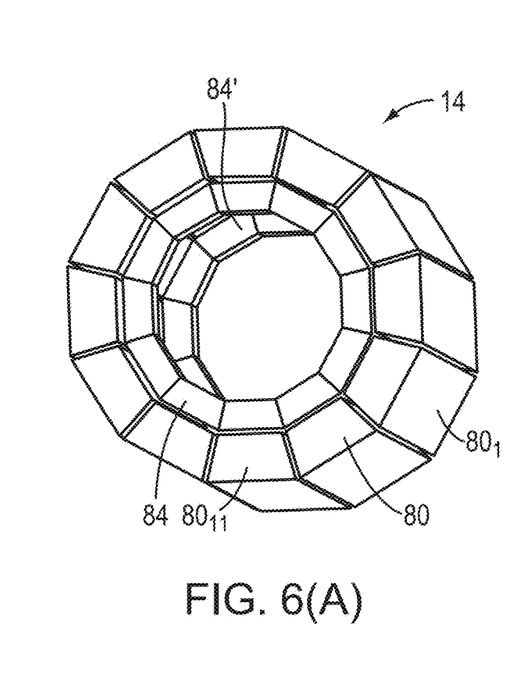
Figure 6B:
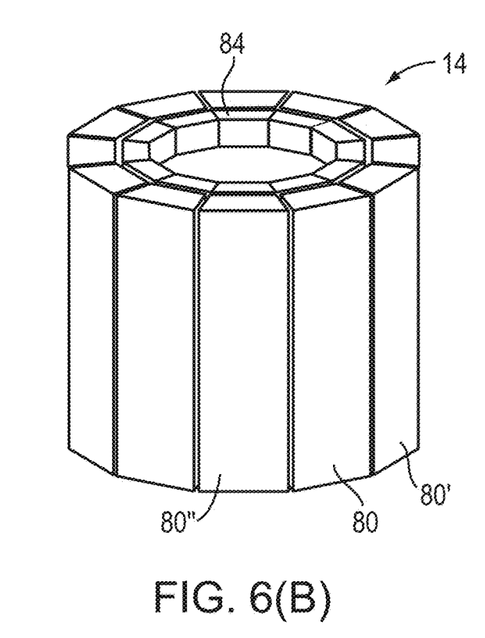
Figure 6C:
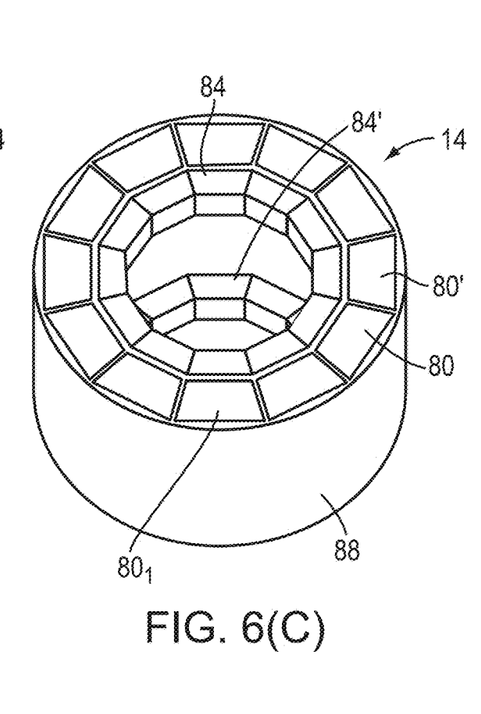

Referring to FIGS. 6 (A) and (B), in one embodiment the magnetic array is constructed as a single Halbach array having a plurality of permanent magnets such as neodymium-iron-boron magnets. In this embodiment, there are twelve permanent magnets ($80, 80_1, 80_2, \ldots, 80_{11}$, generally 80) arranged in a cylinder. At both ends of the cylinder are two magnetic rings 84, 84' to increase the magnetic field at the ends of the array so as to maintain the homogeneity of the magnetic field along the device. FIG. 6(C) depicts the Halbach array with an external circumferential nonmagnetic support 88 to maintain the permanent magnets 80 in their proper positions. In various embodiments, the support may be made from, but not limited to, aluminum, plastic or wood.

Referring to FIGS. 7 (A), (B), (C), and (D), a Halbach array produces one or more magnetic fields inside the array depending on the orientation of the magnetic dipole of the individual permanent magnets that make up the array. Referring to FIG. 7(A), in this embodiment the twelve permanent magnets are arranged with their dipoles oriented outward from the array. This results in no field being generated within the array.

Figure 7A:
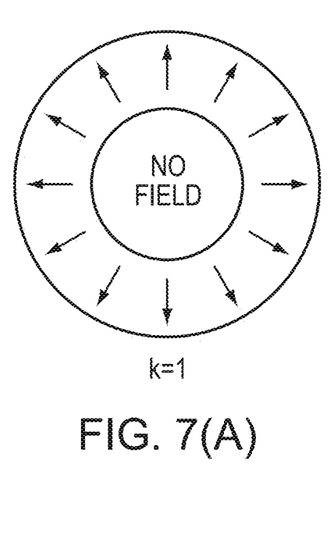
Figure 7B:
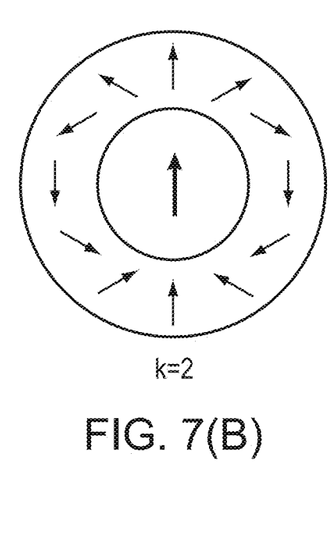

In order to quantify the various types of fields generated by the array, one can count how many revolutions of the dipole take place as one starts with one dipole and moves around the circumference of the array. In FIG. 7(B), starting at the 12:00 o'clock position and moving around the array clockwise, one sees that the dipole at the 6:00 o'clock is oriented in the same direction as the dipole at 12:00 o'clock. Continuing clockwise around the array, the dipole again rotates back to the same position at 12:00 o'clock. Thus, the dipole has rotated twice as we look at the orientation of the dipole as we move once around the array. This array then has a "K" value of 2. This array also produces a magnetic field vector pointed in one direction as indicated by the arrow within the array.

Figure 7C:
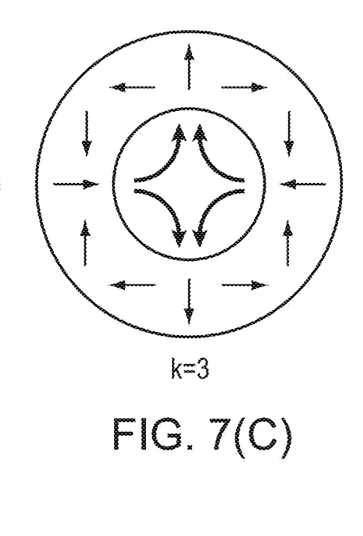
Figure 7D:
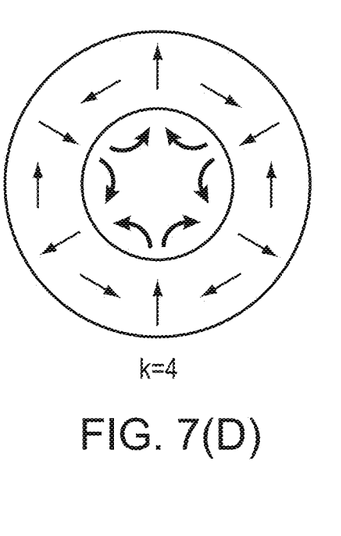

In the previous embodiment, the dipole rotated only once as we moved about the array, so it had a K value of "1". In FIG. 7(C), k=3 and in FIG. 7(D), k=4 and the magnetic field within the array takes on complex forms. The K value of the embodiment of the Halbach array as used herein is "2".

Figure 8:
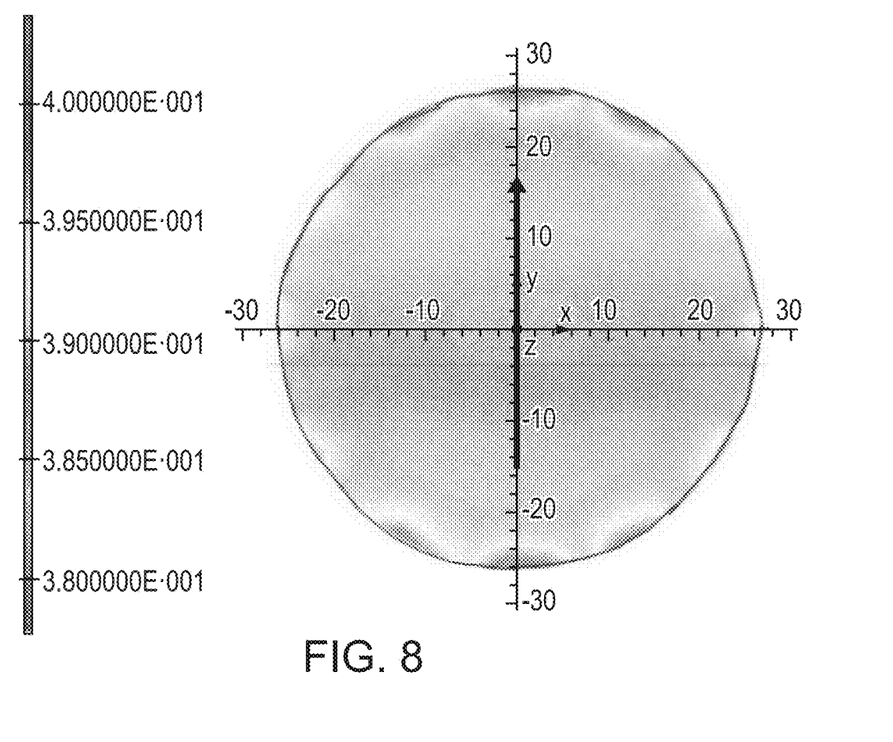
FIG. 8 is a graphical representation of the K=2 magnetic field across a segment of a conduit or chamber 18 perpendicular to the longitudinal axis of the chamber or conduit 18.

A chamber or conduit 18 placed within the Halbach array of K=2 will experience a significant magnetic field across a diameter of the conduit or chamber 18. FIG. 8 is a graphical representation of the result of a mathematical model of a K=2 magnetic field across a segment of a conduit or chamber 18 oriented perpendicular to the longitudinal axis of the chamber or conduit 18. It is apparent that in the orientation shown, the magnetic field axis is primarily along one axis of the graph. If the Halbach array is then rotated about its longitudinal axis, the magnetic field across the array will also rotate and a magnetic particle chain positioned within the chamber or conduit 18 within the array will experience the rotating magnetic field and rotate also.

Figure 9:
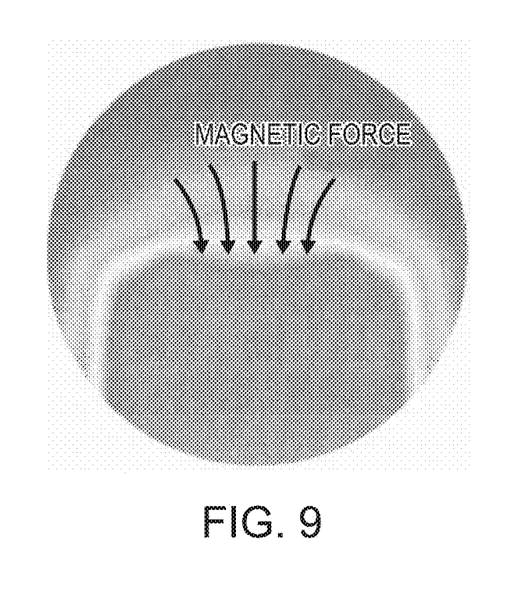
FIG. 9 is a graphical representation of the K=2 magnetic field along the longitudinal axis of conduit or chamber 18 at an end of the chamber or conduit 18.

As the chain is dragged by the fluid passing through the conduit or chamber 18 from the input port 30 to the output port 34, it encounters an additional field near the walls of the conduit or cylinder 18 directed against the flow of the fluid, carrying the magnetic chain back into the body of the chamber 18. FIG. 9 is a graphical representation of the K=2 magnetic field along the longitudinal axis of conduit or chamber 18 at the output port-end of the chamber or conduit 18. As the arrows indicate, a magnetic particle chain will experience a force toward the walls of the chamber or conduit 18 followed by a downward flow back into the chamber or conduit 18. This will cause the magnetic particle chain to remain longer in the chamber or conduit 18 to interact with the target component of interest. The cone 64 shown in FIG. 3(B) is constructed of a plastic such as polycarbonate and aids in moving the magnetic particle chains toward the walls of the chamber 18, so that each magnetic particle chain will encounter the magnetic field directing the particle chain back into the chamber.

Figure 10A:
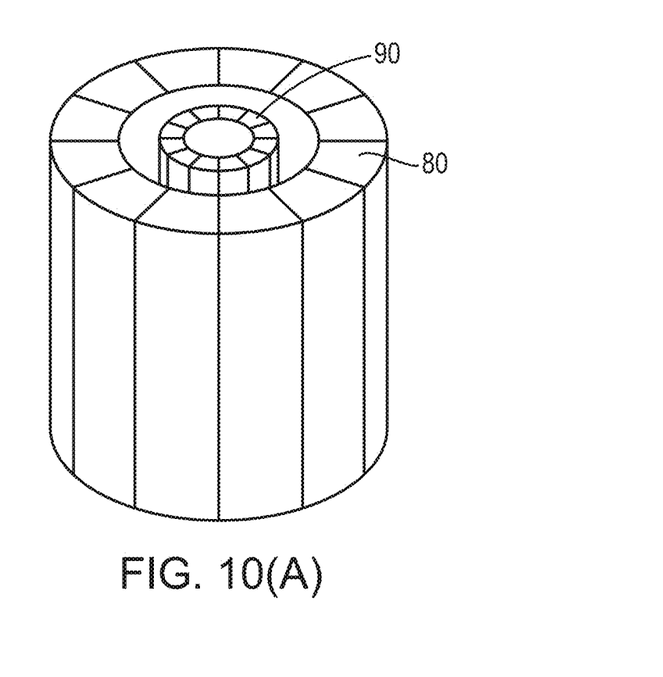
Figure 10B:
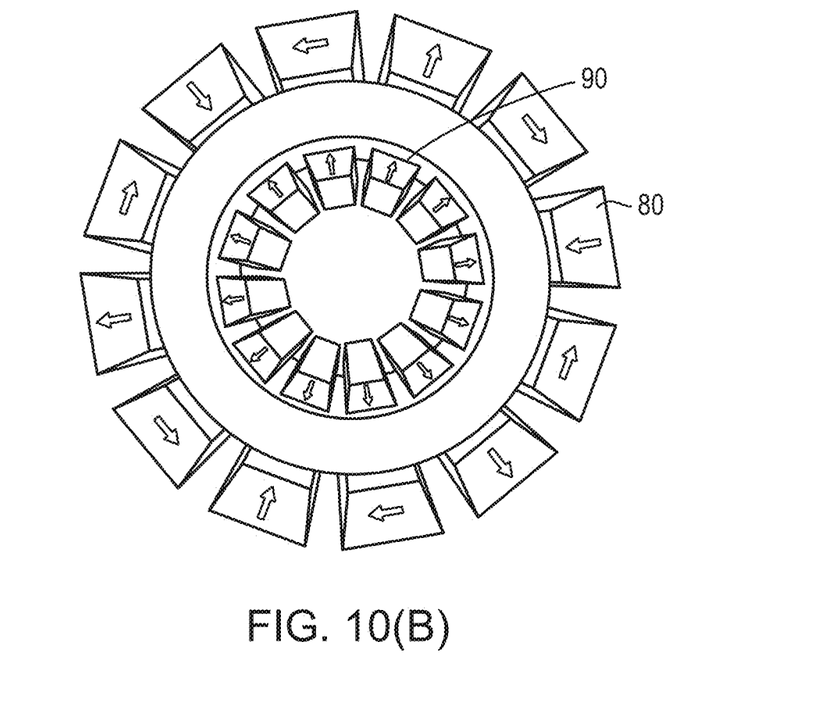

The Halbach array can be modified to accommodate various forms of chamber. Referring to FIG. 10(A), this embodiment of the Halbach array is constructed to accommodate the chamber of FIG. 4. An inner Halbach array 90 fits into the inner space formed by the inner cylinder 70. In the array, the magnetic field vectors (FIG. 10(B)) produced by the inner and outer Halbach arrays sweep through the sample portion of the chamber, allowing the reduced space of confinement of the magnetic chains and the target components to experience a moving magnetic field as in the other embodiments.

Figure 11:
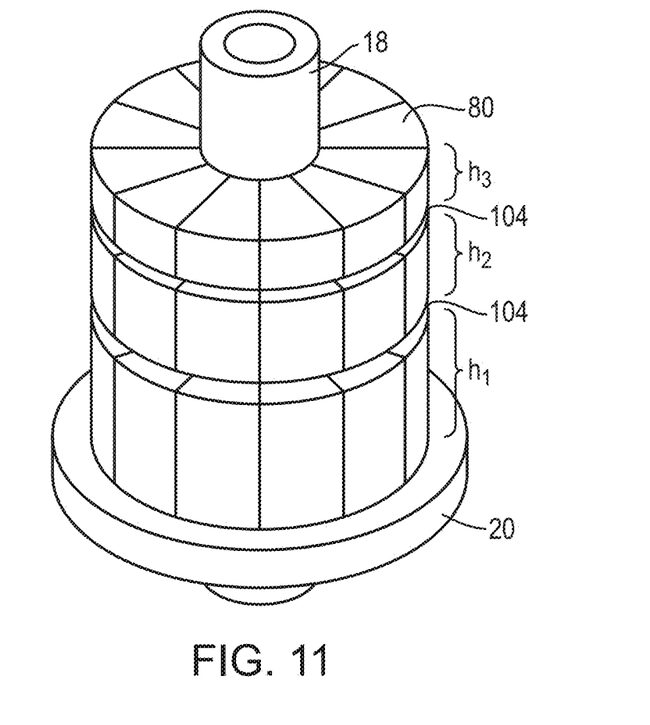
FIG. 11 is perspective view of another embodiment of the Halbach array having a number of subarrays stacked around a chamber or conduit and on a turntable.

FIG. 11 is perspective view of another embodiment of the Halbach array. In this embodiment, a plurality of Halbach subarrays are stacked around a chamber or conduit 18. In this embodiment, each subarray is of a different height (h) with a space 104 between each subarray. The embodiment shown is three subarrays in height, but other stacked arrays are contemplated.

Figure 12:
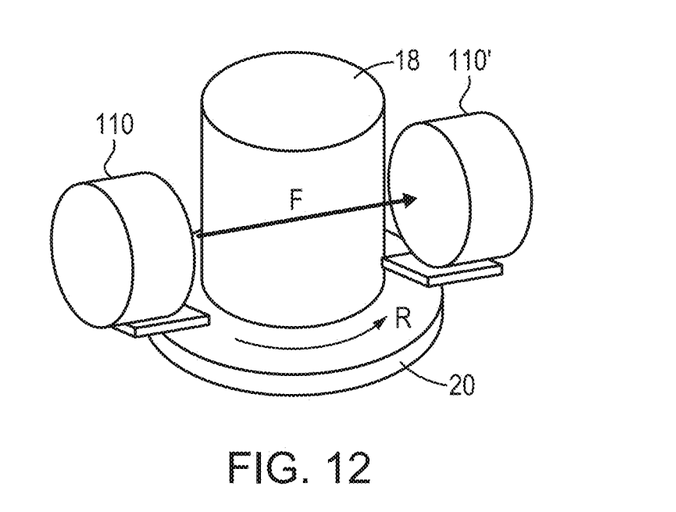
FIG. 12 is another embodiment of the system utilizing electromagnets.

Referring to FIG. 12, the device can also be constructed by placing solenoid electromagnets 110, 110' on opposite sides of the conduit or container 18, the magnets oriented with their poles having opposite polarity. In this way, a magnetic field F passes from one magnet to the other through the container 18. The electromagnets 110, 110' are mounted on the turntable 12 and rotate about the conduit or container 18.

A discussion of the physics behind the operation of the system begins by considering that the Stokes drag force ($F_d$) on a spherical particle moving through a fluid is given by the equation:

$$F_d = -6\pi\eta R v$$

where ($\eta$) is the fluid viscosity, (R) is the hydrodynamic radius of the particle and (v) is the velocity of the particle in (m/s). Similarly, the drag force on a spherical particle at an end of a chain of particles of length (l) rotating in a fluid is given by the equation:

$$F_d = -6(\omega\pi l)$$

where ($\omega$) is the rotational frequency in hertz (Hz) of the rotating chain. The dipole-dipole force holding the chain of such magnetic particles together is given by the equation:

$$F_m = -(3\mu_0/2\pi)(M^2/(2R)^4)$$

where ($\mu_0$) is the permeability of free space, (R) is the hydrodynamic radius of the particle and (M) is the particle's magnetization. The particle magnetization (M) is in turn described by:

$$M = \chi H V$$

Where ($\chi$) is the magnetic susceptibility of the particle material, (H) is the magnetic field (A/m), and (V) is volume of magnetic material in the particle.

Combining the equations:

$$F_m = -(3\mu_0/16\pi)((\chi H V)^2/R^4)$$

The maximum length of the chain occurs when the drag force equals the magnetic force between the magnetic particles:

$$F_d = F_m$$

At this point, the force is such that the particles at the ends of the chain begin to fragment off the chain.

$$6(\omega\pi l) = (3\mu_0/16\pi)(M^2/R^4)$$

The length of the particle chain under rotation is then given by:

$$l = (\mu_0/32\pi^2)(M^2/\eta\omega R^5)$$

Chains of magnetic particles sweep the target components from the liquid more effectively than single particles. To understand this, assume that the probability of a collision between a target component and a magnetic particle is a function of the area occupied by the magnetic particle. If a target component with diameter (D) is moving through the liquid, a region of interaction of the target component with the magnetic particles, each having a radius (R), will be a slice through the liquid with an interaction thickness of (2R)+D. The density of the magnetic particles per slice is ($\rho$). If there are no chains of magnetic particles, i.e. monodisperse particles, the total area occupied by the magnetic particles is $\rho\pi R^2$.

If chains of magnetic particles are formed, the number of magnetic particle chains per ml. of liquid is: $2\rho R/l$, where the number of chains per ml equals number of particles ($\rho$) per ml times the diameter (2R) of each particle divided by length (l) of each chain.

Time for the target component to travel through slice is: $t=(D+2R)/v$, where (v) is the velocity of the target component and depends on flow rate and dimensions of chamber/tubing/cylinder. If $t>1/2\omega$, the rotating chain will complete more than half a rotation which is equivalent to covering the whole area of the circle, so the area covered by the chains is the number of chains ($2\rho R/l$) times the area swept ($\pi(l/2)^2$):

$$(2\rho R/l)(l/2)^2 = \rho R\pi l/2$$

If this is compared to the area covered by the monodisperse particles ($\rho\pi R^2$), one sees:

$$\rho R\pi l/2 > \rho\pi R2$$

Figure 13A:
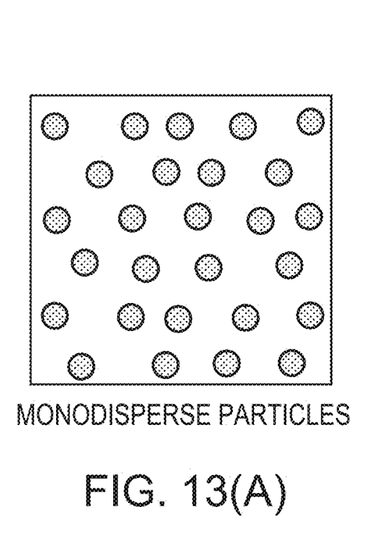
FIG. 13(A) is a diagram showing the area covered by 27 individual particles.
Figure 13B:
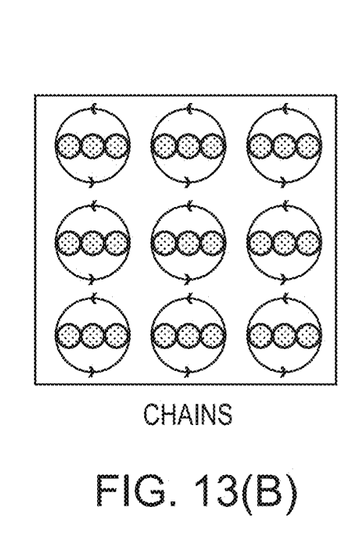
FIG. 13(B) is a diagram showing the area covered by 27 particles arranged in chains of three.

As a result, if (l>2R), the chains sweep and occupy more area than a group of single particles. Because (2R) is the diameter of a single particle, all chains will be better at capturing target components if the transit time (t) is greater than (1/2$\omega$). This is also shown diagrammatically in FIGS. 13 (A) and (B), in which the same number of particles cover a greater area when acting as rotating chains (B) than as individual particles of the same size (A).

If the velocity of the target component is increased such that the transit time $t<1/(2\omega)$, then the magnetic chains will not complete a full rotation and the area swept by the rotating chains will be less. The area covered by the rotating chains is:

$$(2\pi R/l)(l/2)^2(2\omega t) = \rho R\pi l\omega t$$

This area is larger than the area of monodisperse particles:

$$\rho R\pi l\omega t > \rho\pi R2$$

only if:

$$l\omega t > R$$

Remembering that:

$$l = (\mu_0/32\pi^3)(M^2/\eta\omega R^5)$$

$$(\mu_0/32\pi^3)(M^2/\eta R^5)t > R$$

$$(\mu_0 32\pi^3)(M^2/\eta R^6) > 1/t$$

also remembering that:

$$t = (D+2R)/v$$

then:

$$(\mu_0/32\pi^3)(M^2/\eta R^6) > v/(2R+D)$$

As a result, chains are only better if the velocity of the target component (v) is:

$$v < (2R+D)(\mu_0/32\pi^3)(M^2/\eta R^6)$$

That is, the flow rate should be low enough that the chains complete a full rotation.

The limit on the rotational frequency of the field for a particular particle may be calculated as:

$$t = 1/2\omega$$

$$\omega = 1/2t$$

$$\omega = v/(2D+4R)$$

Remembering:

$$l > 2R$$

$$l = (\mu_0/32\pi^3)(\omega HV)^2/(\eta\omega R^5)$$

$$(\mu_0/32\pi^3)(\omega HV)^2/(\eta\omega R^5) > 2R$$

$$\omega < (\mu_0 64\pi^{-3})(M)^2/(\eta R^6)$$

This last equation gives the maximum rotational frequency beyond which chains no longer form. Alternatively, if the magnetic field strength is controlled such that the magnetic particles are not saturated, the relationship becomes:

$$\omega/H^2 < (\mu_0/64\pi^3)(\chi V)^2/(\eta R^6)$$

The actual difference made by an increase in rotational frequency ($\omega$) may be calculated assuming that the number of collisions between the target component and the magnetic particles is directly related to the area covered by particles such that as the area is doubled, so are the collisions. The total area of monodisperse particles is:

$$\rho\pi R^2$$

and the total area of rotating magnetic particle chains at full rotation is:

$$\rho R\pi l/2$$

The improvement factor is:

$$(\rho R\pi l/2)/(\rho\pi R^2) = l/(2R)$$

$$= (\mu_0/32\pi^3)(M^2/\eta\omega R^5)(1/(2R))$$

$$= (\mu_0/64\pi^3)(M^2/\eta fR^6)$$

The more omega is increased beyond a minimum, the smaller the improvement due to formation of chains.

Unless otherwise indicated, all numbers expressing lengths, widths, depths, or other dimensions and so forth used in the specification and claims are to be understood in all instances as indicating both the exact values as shown and as being modified by the term "about." Accordingly, unless indicated to the contrary, the numerical parameters set forth in the specification and attached claims are approximations that may vary depending upon the desired properties. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The terms "a," "an," "the," and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified, thus fulfilling the written description of all Markush groups used in the appended claims.

Certain embodiments are described herein, including the best mode known to the inventor for carrying out the spirit of the present disclosure. Of course, variations on these described embodiments will become apparent to those of ordinary skill in the art upon reading the foregoing description. The inventor expects skilled artisans to employ such variations as appropriate, and the inventor intends for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A system for capturing target components from a liquid, comprising:
   a motorized turntable;
   a speed controller to control rotational velocity of the motorized turntable;

a plurality of magnets arranged in a first Halbach array, the first Halbach array located on the motorized turntable and concentric with the axis of the motorized turntable so as to rotate circumferentially about the outer circumference of a sample conduit, the sample conduit having an input port and an output port and having an outer wall defining a lumen, the sample conduit positioned within the opening and concentric with the axis of the first Halbach array; and a liquid flowing through the sample conduit from the input port to the output port, the liquid containing chains of magnetic particles and one or more chemical agents attached to the chains for capturing said target components from the liquid.

2. The system of claim 1 wherein the fluid further comprises a plurality of magnetic nanoparticles.

3. The system of claim 1 wherein the one or more chemical agents comprise a ligand attached to the magnetic particles.

4. The system of claim 2 wherein the one or more chemical agents comprise a ligand attached to at least one of the magnetic particles and the magnetic nanoparticles.

5. The system of claim 1 wherein the sample conduit comprises a sample container.

6. The system of claim 5 wherein the sample container comprises an inner wall concentric with the outer wall and defining a lumen between the inner and outer wall, the lumen in fluid communication with the input and output ports.

7. The system of claim 6 wherein the system comprises a second Halbach array of magnets within the inner wall of the sample container.

8. The system of claim 1 wherein the first Halbach array has a K=2.

9. The system of claim 7 wherein the second Halbach array has a K=1.

10. The system of claim 5 wherein the sample container has a truncated conical shape with the largest portion of the cone at the input port and the narrowest portion of the cone at the output port.

11. The system of claim 1 wherein the Halbach array comprises a plurality of Halbach arrays stacked axially adjacent to one another and separated by a space.

12. The system of claim 11 wherein the plurality of Halbach arrays have varying heights and are stacked from the greatest height to the smallest height from input port to output port.

13. A system for capturing target components from a liquid comprising:

a sample conduit having an input port and an output port and having an outer wall defining a lumen;

a motorized carrier;

a speed controller to control the rotational speed of the motorized carrier;

a pair of electromagnets attached to the motorized carrier and positioned on opposite sides of the sample conduit; so as to rotates circumferentially about the outer circumference of the sample conduit; and a liquid flowing through the sample conduit from the input port to the output port, the liquid containing chains of magnetic particles and one or more chemical agents attached to the chains for capturing said target components from the liquid.

14. The system of claim 13, wherein the pair of electromagnetics are oriented such that poles of each electromagnetic in the pair have opposite polarity.

15. The system of claim 13, wherein the liquid further comprises a plurality of magnetic nanoparticles, and the one or more chemical agents comprise a ligand attached to at least one of the magnetic particles and the magnetic nanoparticles.

16. The system of claim 13, wherein rotation of the pair of electromagnets rotates the magnetic field about an axis coaxial with the longitudinal axis of the sample conduit with an angular velocity, the strength of the magnetic field and the angular velocity of rotation adjusted such that the magnetic particles form the chains of magnetic particles, the one or more chemical agents being attached to the chains, so as to capture on the chains the target components from the liquid.

* * * * *